United States Patent Office 3,403,983
Patented Oct. 1, 1968

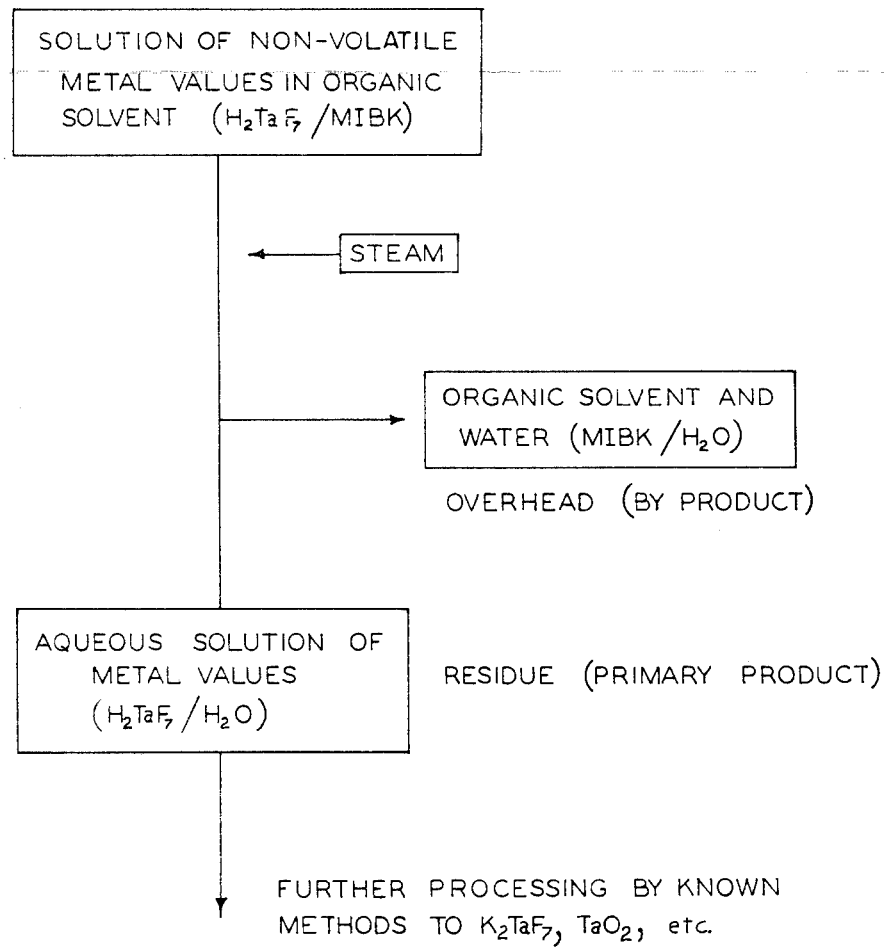

3,403,983
STEAM DISTILLATION OF METAL
VALUES IN SOLUTION
Charles O. Gerfen, Frontenac, and John R. Ruhoff, Webster Groves, Mo., assignors to Mallinckrodt Chemical Works, St. Louis, Mo., a corporation of Missouri
Filed Jan. 11, 1965, Ser. No. 424,835
3 Claims. (Cl. 23—312)

ABSTRACT OF THE DISCLOSURE

A solution of $H_2TaF_7$ in methyl isobutyl ketone (MIBK) is steam distilled. The MIBK passes off overhead as an azeotrope and is recovered. The $H_2TaF_7$ is recovered in the still residue as an aqueous solution having a tantalum concentration three to four times that in the MIBK solution charged.

---

Briefly, the present invention is directed to improved processes for obtaining aqueous solutions of metal values from solutions thereof in organic solvents.

Among the objects of the invention may be mentioned the provision of improvements in processes for obtaining aqueous solutions of metal values; the provision of improved processes for isolating columbium and/or tantalum values from impurities normally associated therewith; and the provision of improved processes for recovering aqueous solutions of fluotantalic acid from solutions thereof in organic solvents. Other objects and features will be in part apparent and in part pointed out hereinafter.

The invention accordingly comprises the methods hereinafter described, the scope of the invention being indicated in the following claims.

In the accompanying drawing, the single figure is a schematic diagram illustrating the process of the invention.

The present invention is directed to processes which comprise steam distilling a solution of metal values in a steam-volatile organic solvent therefor, until the organic solvent is quantitatively evaporated, and recovering an aqueous solution of the metal values.

The use of solvent extraction processes in the extraction and isolation of columbium and tantalum values from ores and slags containing them is well known. In one such process, as disclosed in United States Patent 3,117,833, dated Jan. 14, 1964, of J. A. Pierret, an aqueous feed solution of columbium-tantalum values, obtained by suitable treatment of columbium-tantalum ore, is subjected to a three step countercurrent solvent extraction process. In the first step a highly acid feed solution containing columbium and tantalum values in the form of their fluocomplexes is extracted in a multistage countercurrent extraction apparatus with an immiscible organic solvent, such as methyl isobutyl ketone or diethyl ketone, whereby the fluocolumbic and fluotantalic acids are extracted into the organic phase, leaving the impurities in the aqueous phase.

In the second step, the organic extract from the first step is subjected to multistage countercurrent extraction with an acidic aqueous solvent having a hydrogen ion concentration of about 0.5 N to about 4 N, whereby the columbium fluocomplex is preferentially extracted into the aqueous phase, leaving an organic phase consisting essentially of a solution of pure fluotantalic acid in the organic solvent.

In the third step, the fluotantalic acid is stripped by a similar process into a scrub liquid which may be water or a dilute aqueous acid solution. The tantalum values, free of metallic impurities, are then isolated and converted by known processes into metallurgically useful form, for example $Ta_2O_5$ or tantalum metal. Frequently it is desired to crystallize the tantalum values as potassium fluotantalate from the aqueous solution, this fluotantalate being a useful intermediate in certain processes for producing tantalum metal.

It has been found that the last step in this solvent extraction process, that is, the stripping of the fluotantalic acid from the organic phase into the aqueous phase, suffers from certain drawbacks. For example, under certain conditions troublesome emulsions form in the countercurrent extraction apparatus. Moreover, the aqueous solutions thus obtained often contain a relatively low concentration of fluotantalate, making it necessary to boil off water to increase the fluotantalate concentration to a sufficiently high level to enable the crystallization of potassium fluotantalate to be carried out economically.

It has now been discovered, in accordance with the present invention, that if the organic extract containing fluotantalic acid is subjected to steam distillation, the fluotantalic acid is readily obtained in aqueous solution, and the organic solvent is readily recovered and reused. Moreover, a 3- to 4-fold increase in tantalum concentration is readily and economically achieved at the same time. This avoids the emulsion problem and yields an aqueous product solution that is readily used for the economic crystallization of $K_2TaF_7$.

The following examples illustrate the invention.

Example 1

A metal isobutyl ketone (MIBK) solution of fluotantalic acid (approximately 45.3 g. $Ta_2O_5$ equivalent/liter) obtained by multistep, multistage solvent extraction of an aqueous feed solution resulting from the cracking of columbium/tantalum-containing ore or slag, was placed in a polyethylene bottle fitted with a polyethylene tube for steam sparging and a second polyethylene tube for carrying effluent vapors from the bottle to a condenser. The bottle was heated in a steam bath while steam was introduced through the sparge tube to vaporize the MIBK. From time to time, additional MIBK/fluotantalic acid solution was added to the bottle. The MIBK was steam distilled at a vapor phase temperature of about 89–90° C. The composition of the vapor phase was approximately 80% MIBK: 20% water (v./v.). Near the end of the steam distillation, the temperature of the vapor phase rose to about 100–101° C. In four separate runs, the tantalum concentration in the aqueous fluocomplex solution remaining in the bottle, after essentially complete removal of the MIBK, varied from 135 to 148 g. $Ta_2O_5$ equivalent/liter.

Example 2

An MIBK solution of fluotantalic acid (approximately 40 g. $Ta_2O_5$ equivalents/liter), similar to that described in Example 1, was introduced continuously at a rate of approximately 400 lbs./hr. near the top of a packed distillation column. Low pressure steam was introduced near the bottom of the same column at a rate of approximately 200 lbs./hr. The aqueous product solution of tantalum fluocomplex (approximately 140 g. $Ta_2O_5$ equivalents/liter) was drawn off from the bottom of the column, and after treatment with an adsorbent to remove traces of thermal decomposition products or polymerizable products of the MIBK, it was fed to a crystallizer for crystallization of $K_2TaF_7$ by known methods. The resulting $K_2TaF_7$ was suitable for the production of high quality tantalum metal by known methods. The overhead stream, consisting of excess steam and MIBK/water azeotrope was condensed, the water was drawn off and discarded, and the recovered MIBK was recycled to the solvent extraction apparatus.

The conditions disclosed in the above example may be varied. For example, the concentration of the feed solution may be substantially increased or decreased. Feed solutions containing less than 20 g. and over 50 g. $Ta_2O_5$/liter have been successfully processed. Also, the rate of feed may be varied considerably, the only important consideration being that sufficient steam be supplied to vaporize the organic solvent properly. In the case of an MIBK feed a steam input of about one half pound of MIBK feed is normally adequate. This provides approximately 20% excess steam over that theoretically required. The use of additional steam is uneconomical.

The degree of concentration achieved by the process will approximate the ratio of the latent heats of vaporization of water and the organic solvent in the feed solution.

In the preceding discussion, the process of the invention has been described with particular reference to the scrubbing of a methyl isobutyl ketone extract of fluotantalic acid resulting from a two-step countercurrent solvent extraction processing of a feed solution obtained from processing an ore or other source of columbium and tantalum values. However, the process is applicable to variations of this process. For example, in place of methyl isobutyl ketone, there may be used other substantially water-immiscible, steam-volatile organic solvents, such as diethyl ketone, which are useful in solvent extraction processes of purifying and separating columbium and tantalum values.

Moreover, the process may also be applied to organic feed solutions containing columbium alone or columbium and tantalum together. For example, with reference to the process disclosed by J. A. Pierret in U.S. Patent 3,117,833, the first solvent extraction step yields an organic solution of fluotantalic and fluocolumbic acids substantially free of mineral impurities. If it is desired to recover the mixed columbium and tantalum values at this point, without further separation of the columbium and tantalum values from each other, the organic solution of the mixed fluocomplexes may be subjected to steam distillation in accordance with the present invention to recover an aqueous product solution containing the fluocomplexes of both columbium and tantalum, which may then be further processed as desired.

In the same way, an organic solution of fluocolumbic acid obtained in any convenient manner may be similarly subjected to the steam distillation process of the invention, and the columbium fluocomplex recovered in the aqueous product therefrom.

The process of the invention is also applicable to the recovery of metal values other than those of columbium and tantalum from their solutions in steam-volatile organic solvents. For example, a series of U.S. Atomic Energy Commission Reports (Y–553, Y–559, Y–573, Y–611 and Y–612; declassified 1956) describes processes for the separation of zirconium and hafnium values by countercurrent extraction of an aqueous feed solution containing the mixed metal values with a solution of thiocyanic acid in MIBK (or butyl acetate-MIBK) in which the organic effluent is a solution of thiocyanate complexes of hafnium. The hafnium values may be recovered in aqueous solution by steam distillation of this organic effluent in accordance with the present invention.

It is also known, in the extraction and purification of uranium values for nuclear energy applications, to obtain a solution of uranyl nitrate in ethyl ether or other steam-volatile organic solvent. The uranyl nitrate may be recovered in aqueous solution by steam distillation of such ether or other solutions, in accordance with the process of the present invention.

It is also known (see U.S. Bureau of Mines Report of Investigations 6159; 1963) to extract cobalt values from associated nickel values by solvent extraction with a solution of an amine, such as triisooctylamine in a water-immiscible, steam-volatile solvent such as xylene or kerosene. Cobalt values so obtained may be recovered in an aqueous solution by steam-distilling the organic solution of cobalt-amine complex in accordance with the present invention.

From the foregoing, it will be seen that the present process is generally applicable to any solution of metal values in a steam-volatile organic solvent.

In view of the above it will be seen that the several objects of the invention are achieved and other advantageous results obtained.

As many changes could be made in the above methods without departing from the scope of the invention, it is intended that all matter contained in the above description shall be interpreted as illustrative and not in a limiting sense.

What is claimed is:

1. A process which comprises steam distilling a solution of fluocomplexes of metals selected from the group consisting of columbium and tantalum in a substantially water-immiscible, steam-volatile organic solvent therefor until the organic solvent is quantitatively evaporated, and recovering an aqueous solution of the said fluocomplexes as the undistilled residue.

2. A process which comprises steam distilling a methyl isobutyl ketone solution of fluotantalic acid until the methyl isobutyl ketone is quantitatively evaporated, and recovering an aqueous solution of fluotantalic acid as the undistilled residue.

3. In a process of purifying and isolating tantalum values by solvent extraction utilizing methyl isobutyl ketone as one solvent, the improvement which comprises steam distilling a methyl isobutyl ketone solution of fluotantalic acid until the methyl isobutyl ketone is quantitatively evaporated, and recovering an aqueous solution of fluotantalic acid as the undistilled residue.

References Cited

UNITED STATES PATENTS

| | | | |
|---|---|---|---|
| 2,962,372 | 11/1960 | Foos | 75—121 |
| 3,051,547 | 8/1962 | Bielecki | 75—121 |
| 3,112,991 | 12/1963 | Fisher | 75—21 |
| 3,117,833 | 1/1964 | Pierret | 23—19 |
| 3,164,537 | 1/1965 | Linsk et al. | 203—96 |
| 3,186,833 | 6/1965 | Cech | 75—113 |

WILBUR L. BASCOMB, Jr., *Primary Examiner.*